United States Patent [19]

Staple et al.

[11] Patent Number: 5,219,143

[45] Date of Patent: Jun. 15, 1993

[54] ACTIVE VIBRATION CONTROL SYSTEMS

[75] Inventors: Alan E. Staple, Stoke-sub-Hamdon; Bruce A. MacDonald, Lower Odcombe, England

[73] Assignee: Westland Helicopters Limited, England

[21] Appl. No.: 840,094

[22] Filed: Feb. 24, 1992

[30] Foreign Application Priority Data

Feb. 28, 1991 [GB] United Kingdom ............... 9104189

[51] Int. Cl.⁵ .................................................. F16M 13/00
[52] U.S. Cl. ................................... 248/550; 244/17.11
[58] Field of Search ................ 248/550, 566; 364/508; 244/17.11, 17.13, 17.25, 17.27

[56] References Cited

U.S. PATENT DOCUMENTS

| | | |
|---|---|---|
| 3,477,665 | 11/1969 | Legrand . |
| 3,509,971 | 5/1970 | Gerstine et al. ............ 244/17.11 X |
| 3,606,233 | 9/1971 | Scharton et al. ........... 244/17.25 X |
| 3,635,427 | 1/1972 | Balke .............................. 248/550 X |
| 3,690,607 | 9/1972 | Mard ............................ 244/17.25 X |
| 4,819,182 | 4/1989 | King et al. . |
| 4,937,758 | 6/1990 | Hayden et al. ............. 244/17.11 X |
| 4,953,098 | 8/1990 | Fischer et al. ............. 244/17.11 X |
| 5,156,370 | 10/1992 | Silcox et al. ..................... 248/550 |

Primary Examiner—David M. Purol
Attorney, Agent, or Firm—Larson & Taylor

[57] ABSTRACT

An active vibration control system for reducing vibration of a structure includes a first control loop comprising sensors for sensing forces in a primary vibratory load path and providing signals to a control unit incorporating time domain control logic for providing first actuator demand signals, a second control loop comprising sensors for sensing secondary vibration forces and providing signals to a control unit incorporating frequency domain control logic for providing second actuator demand signals, and a summing device for summing the first and second actuator demand signals and providing resultant signals for operating a plurality of actuators for inputting controlled vibration response forces into the structure to reduce vibration.

7 Claims, 3 Drawing Sheets

ACTIVE VIBRATION CONTROL SYSTEMS

BACKGROUND OF THE INVENTION

1. Field of the Invention

This invention relates to active vibration control systems particularly but not exclusively for use in reducing vibration of a helicopter fuselage.

2. Description of the Prior Art

In active vibration control systems one or more controlled excitations are applied to a vibrating structure to alleviate a vibration response generated by one or more uncontrolled excitation sources. Typically, the sources of the controlled excitations are actuators controlled so as to produce a vibratory force or motion and, in the helicopter case, the source of uncontrolled vibration is a main sustaining rotor. Unlike alternative passive techniques in which a device responds mechanically through feedback of vibration local to the device, active systems are based on the feedback of vibration, usually from sensors dispersed around the structure or airframe, so as to adapt the controlled excitations to account for changes in the uncontrolled vibration forcing which, in the helicopter case, will arise due to changes in operating conditions.

Several techniques based on differing control philosophies have been proposed for implementing active vibration control for alleviating vibration of a helicopter fuselage. One such technique known as Higher Harmonic Control (HHC) is based on the application of vibratory pitch motions to the rotor blades of a main sustaining rotor to reduce the primary vibratory forcing at its source. Another technique has attempted to actively isolate a structure such as a helicopter fuselage from the primary vibration source. Both these techniques suffer performance constraints, the former in terms of power requirements and high speed performance and the latter in terms of a high weight requirement for effective isolation of all the vibratory load paths.

U.S. Pat. No. 4,819,182 describes an active vibration control system which overcomes the problems associated with such prior techniques. Termed "Active Control of Structural Response" (ACSR), the system differs from prior techniques in that it is based on the superposition of the uncontrolled vibration response and the controlled vibration response, which is controlled in such a way that vibration is minimised throughout the structure.

Thus, whilst ACSR uses the basic system components of actuators, controller and sensors of the prior active techniques described above, it operates in a fundamentally different way. ACSR differs from HHC in that the controlled excitations or forces are applied by the actuators at or across points of the structure capable of relative motions in the dominant vibratory modes. The actuators can either be connected between two points of the structure, e.g. between a gearbox and a fuselage, in what is termed a dual point actuation system or alternatively can be connected between the structure at one point and a seismic mass to generate the required forcing. The latter arrangement is termed a single point actuation system. ACSR differs from prior isolation techniques since it makes no attempt to control directly the vibratory load paths across an isolation interface.

ACSR incorporating frequency domain control logic has proved highly successful in helicopters by reducing overall vibration of the fuselage by a value of about 80 percent and localised improvements of over 90 percent. However, transient delays in each control cycle may impose limitations preventing further improvement in such systems. Similarly, ACSR systems incorporating alternative time domain control logic may experience performance limitations due to a lack of adaptability in respect of changing dynamic characteristics.

An objective of this invention therefore is to provide an active vibration control system having the potential for improved performance.

SUMMARY OF THE INVENTION

Accordingly, in one aspect, this invention provides an active vibration control system for reducing vibration of a structure subject to primary vibration forces transmitted through a primary vibratory load path from a source of repetitive vibration and secondary vibration forces, the system comprising a plurality of actuators connected at or across parts of the structure capable of relative motion at an exciting frequency, a first control loop comprising sensors for sensing forces in the primary vibratory load path and providing signals to a control unit incorporating time domain control logic for providing first actuator demand signals, a second control loop including a plurality of sensors for sensing said secondary vibration forces on the structure and providing signals to a control unit incorporating frequency domain control logic for providing second actuator demand signals, and summing means for summing the first and second actuator demand signals and providing resultant actuator demand signals for operating the actuators to reduce vibration of the structure.

The primary vibratory load path may comprise a plurality of mechanical struts interconnecting parts of said structure.

The actuators may be located in the primary vibratory load path and, conveniently, may be integral with the mechanical struts.

The parts of the structure may comprise a gearbox and fuselage of a helicopter.

In another aspect the invention provides an active vibration control system for reducing vibration of a helicopter fuselage and resulting from primary vibration forces transmitted through a primary vibratory load path and secondary vibration forces from other sources, the system comprising a plurality of actuators connected at or across parts of the helicopter structure capable of motion at an exciting frequency, a first control loop comprising sensors for sensing forces in the primary vibratory load path and providing signals to a control unit incorporating time domain control logic for providing first actuator demand signals, a second control loop including a plurality of sensors for sensing said secondary vibration forces in the fuselage and providing signals to a control unit incorporating frequency domain control logic for providing second actuator demand signals, and summing means for summing said first and second actuator demand signals and providing resultant actuator demand signals to reduce vibration transmitted through the primary vibratory load path and said secondary vibrations in the fuselage.

In yet another aspect the invention provides a method for reducing vibration of a structure subjected to both primary vibration forces transmitted through a primary vibratory load path and secondary vibration forces from other sources comprising the steps of sensing the primary vibration forces and providing signals representative thereof, treating said signals using time domain control logic to provide first actuator demand signals, sensing said secondary vibration forces and providing signals representative thereof, treating said signals using frequency domain control logic to provide second actuator demand signals, and summing said first and second actuator demand signals to provide resultant actuator demand signals for operating a plurality of actuators to input controlled forces into the structure to reduce vibration.

BRIEF DESCRIPTION OF THE DRAWINGS

The invention will now be described by way of example only and with reference to the accompanying drawings in which.

DETAILED DESCRIPTION OF THE DRAWINGS

Figure 1:
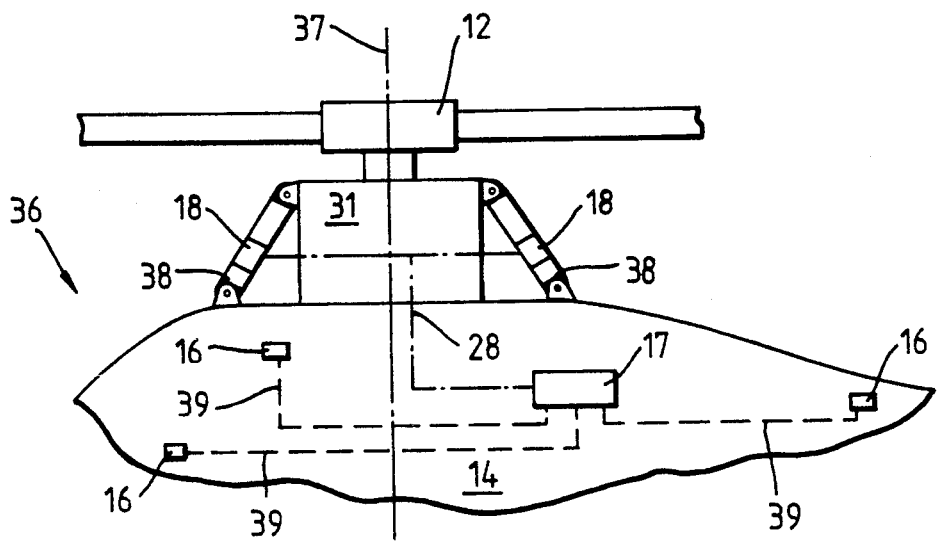
FIG. 1 is a fragmentary side view of a helicopter incorporating an active vibration control system according to the prior art.

Referring now to FIG. 1, a helicopter generally indicated at 36 has a fuselage 14 carrying a gearbox 31 driving a main sustaining rotor 12 about a generally vertical axis 37. Gearbox 31 is supported from fuselage 14 by at least four strut assemblies 38 (two only being shown) attached between the gearbox 31 and fuselage 14.

Each of the strut assemblies 38 comprises a primary load path for transmitting primary flight and manoeuvring loads, generated by the rotor 12, from the gearbox 31 to the fuselage 14.

Helicopter 36 includes an active vibration control system as described in the aforementioned U.S. Pat. No. 4,819,182. Basically the system comprises a plurality of vibration sensors 16, e.g. accelerometers, located at strategic positions throughout the fuselage 14 and connected to an adaptive computer control unit 17 which provides signals to an electro-hydraulic actuator 18 located integrally with each of the strut assemblies 38 for inputting forcing loads as described in U.S. Pat. No. 4,819,182.

Operation of the active vibration control system of FIG. 1 will now be described briefly with reference to FIGS. 2 and 3. For a more detailed explanation reference should be made to a paper entitled "An Evaluation of Active Control of Structural Response as a Means of Reducing Helicopter Vibration" presented by Alan E. Staple of Westland Helicopters Limited at the 15th European Rotorcraft Forum in 1989.

Helicopter flight conditions 11 create with the main sustaining rotor 12, uncontrolled vibratory forces 13 which are input into the fuselage structure 14 which has particular dynamic characteristics. This interaction results in fuselage vibrations 15.

The plurality of vibration sensors 16 located throughout the fuselage and critical components, measure fuselage vibrations at key locations and provide signals 39 which are fed to the adaptive computer control unit 17.

The control unit 17 provides optimal actuator demand signals 40 to the force actuators 18 which must be equal to or less in number than the number of sensors 16 and which are connected at or across locations on the fuselage capable of relative motion in the dominant vibratory modes. The actuators 18 produce controlled forces 40 which minimise vibration at the sensor locations. As hereinbefore described, in the illustrated embodiment, this is achieved by locating the actuators 18 integrally with the struts 38 interconnecting the gearbox 31 and the fuselage structure 14.

The fundamental principle of the prior art active vibration control system is therefore one of superposition whereby the summed effect of rotor-induced vibratory response and the actuator response is maintained at a minimum.

Either of two categories of control logic can be utilised in the control unit 17 which are identified according to the domain in which they operate, i.e. either time or frequency.

In systems incorporating time domain control logic, signals representative of vibration are fed back through a series of coefficient matrices at a rate that is higher than the vibration being controlled. The subsequent vibration waveform contains information over a wide bandwidth of frequencies, and some degree of control is possible throughout the bandwidth.

In systems incorporating frequency domain control logic, control inputs are periodic and the phase of the inputs is synchronised to a reference signal from near the source of primary excitation, i.e. the sustaining rotor 12 in the illustrated embodiment. Such systems are concerned with the control of discrete frequencies, for example in the helicopter application the control inputs contain the dominant blade passing frequency and harmonics thereof.

An inherent inability of a time domain system to provide necessary robustness in respect of changes in structural response characteristics encountered in helicopter applications overshadows its primary advantage, namely, its ability to rapidly adjust to transient forcing conditions at all frequencies within a large bandwidth. Furthermore, since the vibration problem encountered in helicopters consists of periodic excitations at known critical frequencies, prior active control systems including the aforementioned ACSR system have utilised a frequency domain control logic in adaptive control algorithms.

Such a control system operates on a cyclic basis, with the actuator forcing being maintained at a constant level while the control algorithms calculate the optimal actuator forcings required to update the control at the next cycle. The practical timings in each control cycle 'N' associated with the installation of a particular prior art controller 17 are shown in FIG. 3 which shows that the cyclic sequence of the control process is separated into three distinct stages:

1) Digital Signal Processing-the dominant blade passing frequency component of the vibration waveform is extracted using signal processing techniques 19 using discrete Fourier transform theory or, more accurately, extracting an accurate measurement of vibration at predetermined frequencies at which the controller is operating.

2) Dynamic Parameter Estimation-the measured acceleration data is used by a dynamic parameter estimator which updates at 20 estimates of the transfer function relating the vibration to the actuator demand.

3) Optimal Control-uses the estimates to minimise at 21 a quadratic performance cost function, based on the weighted squares of the control forces and the structural vibration, to generate actuator demands 28 for the next control cycle N.

The important adaptability of such a control system is provided by the estimator which permits the periodic update of the model and provides desired robustness to changes in the fuselage dynamics.

Performance of the existing frequency domain control system during fast manoeuvres and disturbances is limited by the requirement to accurately extract the steady forced response component from the transient response which includes both the forced response component and a decaying free response component which otherwise would corrupt accurate measurement. In reality this involves an undesirable transient delay as indicated at 22 in the update time at the commencement of each control cycle 'N' while the transients from the previous actuator input 28 are allowed to decay and subsequent data is gathered for signal processing 19. The transient delay period 22 could be reduced but only at the expense of an increase in time required for signal processing 19.

As stated previously, in the illustrated embodiment in the helicopter 36 the force actuators 18 are incorporated in the plurality of struts 38 interconnecting the gearbox 31 and the fuselage 14, the struts 38 representing a primary vibratory load path for transmitting vibration forces from the main sustaining rotor 12 to the fuselage 14. In testing such a system it was noted that, for certain helicopter configurations, loads in the struts 38 were reduced by an order of magnitude proportional to the total reduction in fuselage vibration. This indicated to the inventors that an active vibration control system based on the principle of reducing the loading in the primary vibratory load path could provide an overall reduction of vibration similar to that of the prior ACSR system, and this pointed to a potential to improve the performance of an existing frequency domain ACSR system by augmenting it with a time domain system acting in or around a primary vibratory load path such as that represented by the gearbox/fuselage interface of the aforementioned installation.

In the context of this invention the term "primary vibratory load path" describes generally a load path to which the application of a control input will have a direct effect at a prescribed location. This implies that there must be a high degree of correlation between the forcing input and the response at key locations connected by such a load path.

Thus, the active vibration control system of this invention comprises a combination of the two aforementioned control logic categories. A time domain system is used to reduce baseline vibration transmitted to the fuselage through the primary vibratory load path by direct control of the vibration induced loads in the load path, operating in parallel with a frequency domain system similar to that of the prior art to reduce the vibration from all secondary sources and secondary vibratory load paths as well as in uncontrolled primary vibratory load paths. Secondary sources may include main rotor wake interaction with the tail boom and vibration passed from the main sustaining rotor to the fuselage through secondary vibratory load paths such as torque tube connections.

Figure 2:
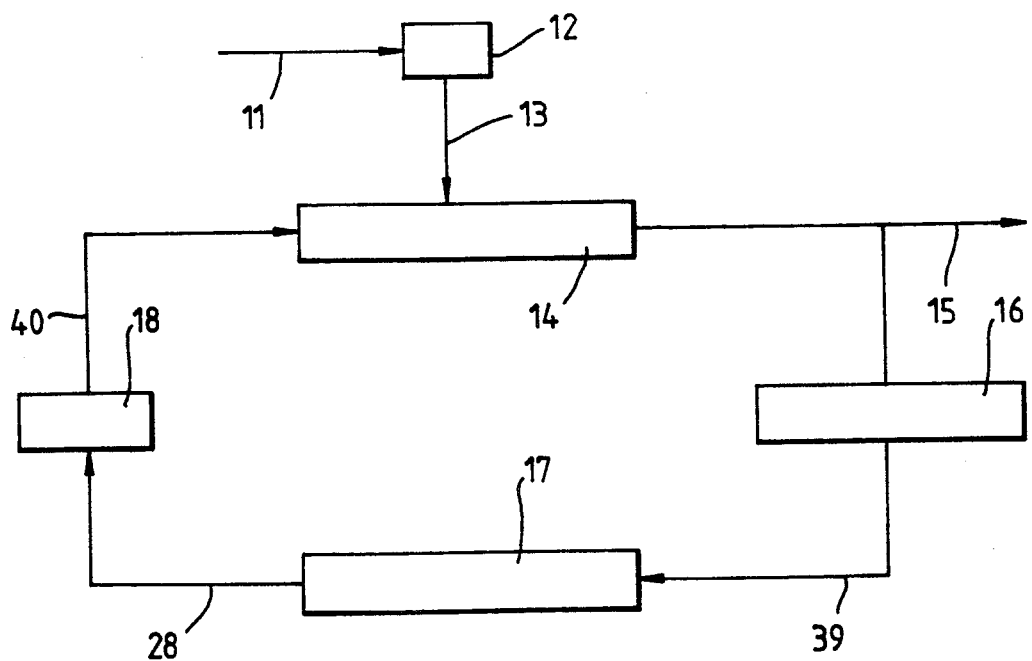
FIG. 2 is a schematic arrangement of the active vibration control system of FIG. 1.
Figure 3:
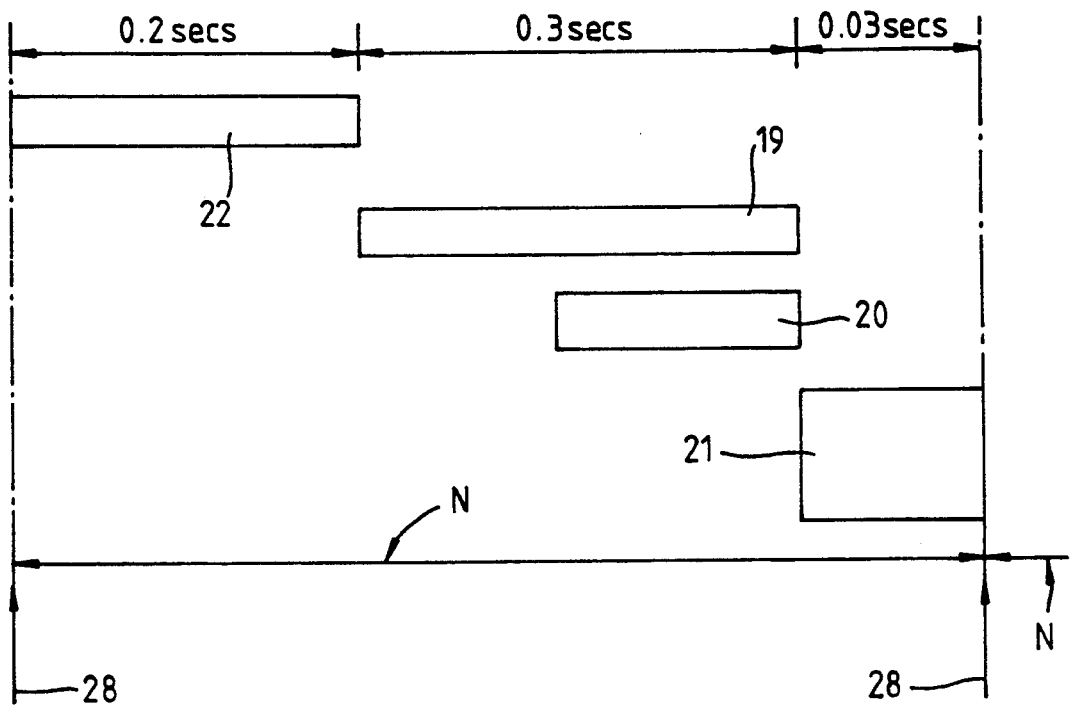
FIG. 3 is a control timing diagram for the system of FIGS. 1 and 2.
Figure 4:
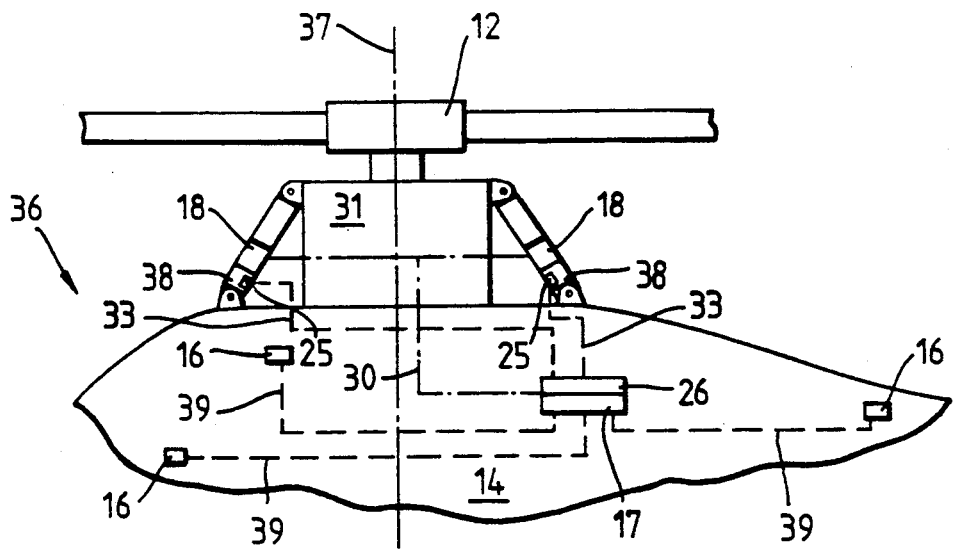
FIG. 4 is a fragmentary side view of a helicopter incorporating an active vibration control system according to this invention.
Figure 5:
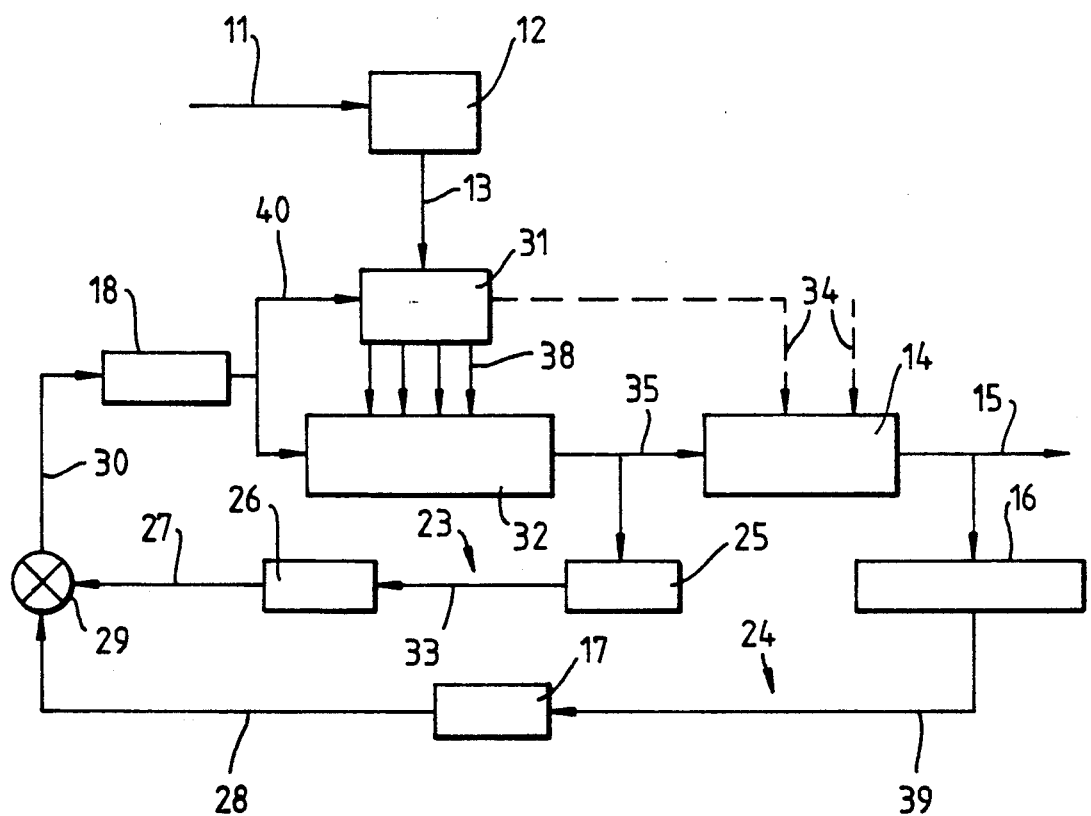
FIG. 5 is a schematic arrangement of the active vibration control system of FIG. 4.

An active vibration control system according to one embodiment of this invention is illustrated schematically in FIGS. 4 and 5 in which components retained from the prior art ACSR system of FIGS. 1, 2 and 3 have the same reference numerals.

Thus, a sensor 25 is located in each primary vibratory load path and, to that end, in the illustrated embodiment, is attached to each of the struts 38 to provide a signal 33 representative of the loads in the primary vibratory load paths. The signals are routed to a computer control unit 26 incorporating time domain control logic and which operates with adaptive computer control unit 17 as hereinafter described to provide optimal signals 30 to the actuators 18.

Referring now to FIG. 5, the vibration control system of this invention comprises a first control loop 23 including the sensors 25 and the time domain control unit 26 and a second control loop 24 consisting of the system as hereinbefore described with reference to FIGS. 1, 2 and 3 and including accelerometers 16 and the frequency domain control unit 17. Actuator demand signals 28 and 27 from the respective control units 17 and 26 are summed in a summing device 29 to provide resultant actuator demand signals 30 which are fed to the force actuators 18 which, as in the prior art, produce controlled forces 40 to minimise vibration.

Uncontrolled vibration forces 13 from the helicopter rotor 12 are transmitted to the gearbox 31 which is attached to fuselage 14 through a gearbox/fuselage interface 32 by the four attachment struts 38 each comprising a primary vibratory load path. Whilst illustrated separately in FIG. 5, in the preferred embodiment the actuators 18 are coincident with each of the primary vibratory load paths and as previously explained in a particular installation this is achieved by locating the actuators 18 integral with the mechanical struts 38 connected between the gearbox 31 and fuselage 14, i.e. a dual point actuation system, as shown in FIG. 4.

Secondary vibration forces 34 are transmitted to the fuselage 14 through secondary vibratory load paths from the gearbox 31 and from other sources as hereinbefore described.

The time domain control unit 26 of the first control loop 23 uses direct feedback vibration measurements 33 from the sensors 25, which may comprise for example strain gauges or accelerometers, located on the gearbox/fuselage interface 32 to isolate the fuselage 14 from the primary uncontrolled forces 13 by reducing the vibrations transmitted through the primary vibratory load path through the struts 38.

Control unit 26 uses a series of coefficient matrices which transpose vibration feedback signal into actuator control forcing to provide not only the control of a large bandwidth of frequencies but also good transient performance since it is not dependent on periodic measurements. In its simplest form control loop 23 is based on constant coefficient matrices and does not adapt to changes in helicopter dynamic characteristics, however, systems are also envisaged wherein the coefficient matrices are adapted according to helicopter dynamic characteristics.

Thus, the first control loop 23 reduces the transmission of vibration across selected primary vibratory load paths to the fuselage 14 by control of vibration forces transmitted through the primary vibratory load paths so that residual vibration forces only as indicated at 35 enter the fuselage 14 from that source. It is to be remembered that the control gains in the time domain system of the first control loop 23 will be set for a certain helicopter configuration and may not be optimal as dynamic characteristics change during operation resulting in changes in the residual vibration forces 35. The residual vibration forces 35 are combined with secondary vibration forces 34 transmitted through the secondary vibratory load paths both from the gearbox 31 and all other sources, the resulting vibration forces being reduced by the second control loop 24 which operates in the frequency domain and provides adaptive control of the blade passing frequency component of the vibration waveform and other harmonics of the rotor speed similar to the prior art control system.

The actuator demand signals 30 are therefore a combination of signals from the time domain control logic of the first control loop 23 and the frequency domain control logic of the second control loop 24. Thus the vibration control system of this invention combines the advantages of the adaptability of a frequency domain system with the good transient performance of a time domain system to further reduce vibration in respect of levels achieved by the prior art system. Furthermore, the dual system of this invention provides a degree of redundancy giving desirable fail safety features.

Whilst one embodiment has been described and illustrated it will be understood that many modifications may be made without departing from the scope of the invention. For example, whilst it is preferred that the actuators 18 are coincident with the primary vibratory load paths, practical considerations may preclude this in some installations and the actuators should in those cases be located as close as possible to the primary vibratory load paths. In other installations the primary vibratory load paths may operate through attachments between the respective parts of the structure other than the strut attachments of the illustrated embodiments. The invention can be implemented in systems having a single point actuation system as well as the dual point actuation system of the described embodiment. Whilst described in respect of installation in a helicopter the active vibration control system of this invention can be used effectively in other vehicles and also in static installations subject to vibration.

What is claimed is:

1. An active vibration control system for reducing vibration of a structure subject to primary vibration forces transmitted through a primary vibratory load path from a source of repetitive vibration, and secondary vibration forces, the system comprising a plurality of actuators connected at or across parts of the structure capable of relative motion at an exciting frequency, a first control loop comprising sensors for sensing forces in the primary vibratory load path and providing signals to a control unit incorporating time domain control logic for providing first actuator demand signals, a second control loop including a plurality of sensors for sensing said secondary vibration forces on the structure and providing signals to a control unit incorporating frequency domain control logic for providing second actuator demand signals, and summing means for summing the first and second actuator demand signals and providing resultant actuator demand signals for operating the actuators to reduce vibration of the structure.

2. A system as claimed in claim 1, wherein said primary vibratory load path comprises a plurality of mechanical struts interconnecting parts of the structure.

3. A system as claimed in claim 1 wherein said actuators are located in said primary vibratory load path.

4. A system as claimed in claim 2 wherein said actuators are integral with said mechanical struts.

5. A system as claimed in claim 1, wherein said parts of the structure comprise a gearbox and fuselage of a helicopter.

6. An active vibration control system for reducing vibration of a helicopter fuselage, said vibration resulting from primary vibration forces transmitted through a primary vibratory load path and secondary vibration forces from other sources, including a plurality of actuators connected at or across parts of the structure capable of motion at an exciting frequency, a first control loop comprising sensors for sensing forces in the primary vibratory load path and providing signals to a control unit incorporating time domain control logic for providing first actuator demand signals, a second control loop including a plurality of sensors for sensing said secondary vibration forces in the fuselage and providing signals to a control unit incorporating frequency domain control logic for providing second actuator demand signals, and summing means for summing said first and second actuator demand signals and providing resultant actuator demand signals to reduce vibration transmitted through the primary vibratory load path and said secondary vibrations in the fuselage.

7. A method for actively reducing vibration of a structure subjected to both primary vibration forces transmitted through a primary vibratory load path and secondary vibration forces from other sources is characterised by the steps of sensing the primary vibration forces and providing signals representative thereof, treating said signals using time domain control logic to provide first actuator demand signals, sensing said secondary vibration forces and providing signals representative thereof, treating said signals using frequency domain control logic to provide second actuator demand signals, summing said first and second actuator demand signals to provide resultant actuator demand signals for operating a plurality of actuators to input controlled forces into the structure to reduce vibration.

* * * * *